(12) United States Patent
Salter et al.

(10) Patent No.: US 10,035,473 B2
(45) Date of Patent: Jul. 31, 2018

(54) VEHICLE TRIM COMPONENTS

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); Michael A. Musleh, Canton, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/343,660

(22) Filed: Nov. 4, 2016

(65) Prior Publication Data

US 2018/0126922 A1     May 10, 2018

(51) Int. Cl.
*B60R 13/04*     (2006.01)
*B60R 13/00*     (2006.01)
*B60R 13/02*     (2006.01)

(52) U.S. Cl.
CPC ............ *B60R 13/005* (2013.01); *B60R 13/02* (2013.01); *B60R 13/0256* (2013.01); *B60R 13/04* (2013.01)

(58) Field of Classification Search
CPC ....... B60R 13/00; B60R 13/005; B60R 13/02; B60R 13/0256; B60R 13/04
USPC .................................................. 428/31, 195.1
See application file for complete search history.

(56) References Cited

U.S. PATENT DOCUMENTS

| | | |
|---|---|---|
| 2,486,859 A | 11/1949 | Meijer et al. |
| 4,877,657 A * | 10/1989 | Yaver ................ B60R 13/04 428/31 |
| 5,053,930 A | 10/1991 | Benavides |
| 5,434,013 A | 7/1995 | Fernandez |
| 5,709,453 A | 1/1998 | Krent et al. |
| 5,718,950 A | 2/1998 | Komatsu et al. |
| 5,839,718 A | 11/1998 | Hase et al. |
| 6,031,511 A | 2/2000 | DeLuca et al. |
| 6,117,362 A | 9/2000 | Yen et al. |
| 6,383,613 B1 | 5/2002 | Takeda |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,761,959 B1 | 7/2004 | Bonkowski et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |

(Continued)

FOREIGN PATENT DOCUMENTS

| | | |
|---|---|---|
| CN | 1042928 | 6/1990 |
| CN | 101337492 A | 1/2009 |

(Continued)

*Primary Examiner* — Bruce H Hess
(74) *Attorney, Agent, or Firm* — Vichit Chea; Price Heneveld LLP

(57) ABSTRACT

A vehicle includes an instrument panel. A trim piece is positioned on the instrument panel and includes a surface defining a pattern. The pattern includes a body portion and a border portion. A diffraction grating is positioned within the boarder portion. The diffraction grating has a thickness of between about 250 nm to about 1000 nm.

20 Claims, 5 Drawing Sheets

(56) References Cited

U.S. PATENT DOCUMENTS

| | | |
|---|---|---|
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,667,895 B2 | 2/2010 | Argoitia et al. |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,324,835 B2 | 12/2012 | Shum et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2006/0226758 A1 | 10/2006 | Sofue et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0274321 A1 | 11/2008 | Lefaux et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0299796 A1 | 11/2013 | Masuyama et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0283940 A1 | 10/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2027986 | 2/2009 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE TRIM COMPONENTS

FIELD OF THE INVENTION

The present disclosure generally relates to vehicle trim components, and more particularly, to trim components for automotive vehicles having iridescent features.

BACKGROUND OF THE INVENTION

Iridescent components used in vehicles may offer a unique and attractive viewing experience. It is therefore desirable to incorporate such iridescent systems in portions of vehicles to enhance the aesthetic appearance of the vehicle.

SUMMARY OF THE INVENTION

According to one aspect of the present disclosure, a vehicle includes an instrument panel. A trim piece is positioned on the instrument panel and includes a surface defining a pattern. The pattern includes a body portion and a border portion. A diffraction grating is positioned within the boarder portion. The diffraction grating has a thickness of between about 250 nm to about 1000 nm.

According to another aspect of the present disclosure, an exterior trim component includes a surface defining a pattern. The pattern includes a body portion and a border portion. A diffraction grating is positioned within the border portion. The diffraction grating includes a plurality of ridges having a thickness of between about 250 nm to about 1000 nm and a period of the diffraction grating is between about 50 nm and about 5 microns.

According to yet another aspect of the present disclosure, a vehicle trim component includes a surface defining a pattern. The pattern includes a body portion and a border portion. A diffraction grating is positioned within the border portion. The diffraction grating extends over the length of the border portion to outline the pattern.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
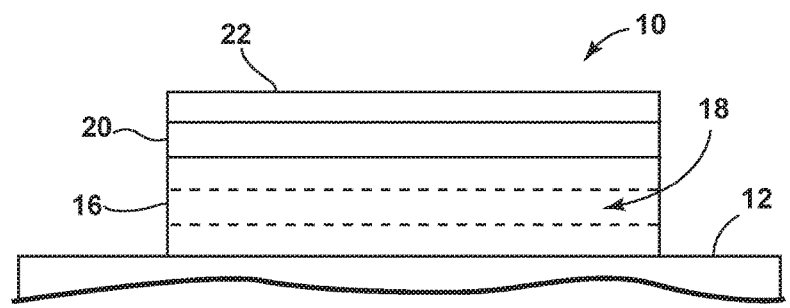
FIG. 1A is a side view of a photoluminescent structure rendered as a coating for use in a vehicle light strip according to one example.
Figure 1B:
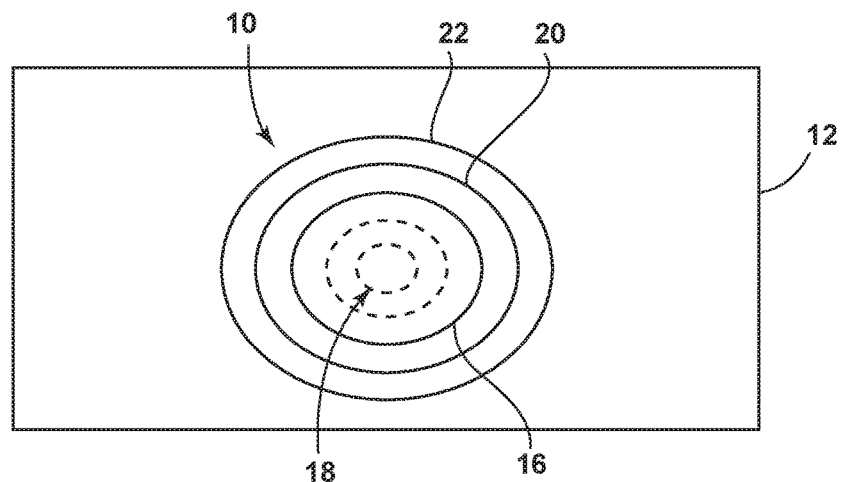
FIG. 1B is a top view of a photoluminescent structure rendered as a discrete particle according to one example.
Figure 1C:
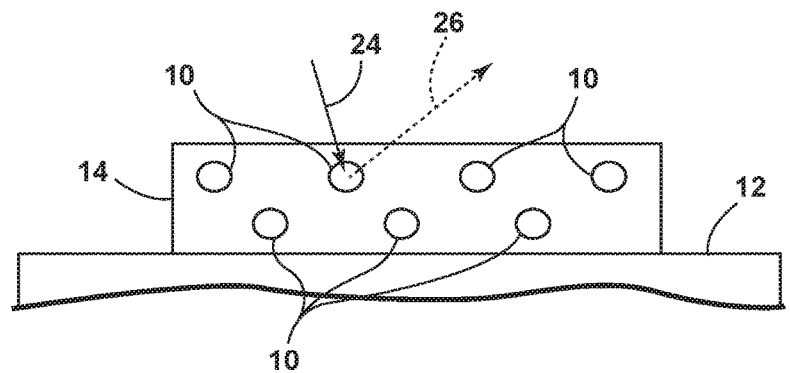
FIG. 1C is a side view of a plurality of photoluminescent structures rendered as discrete particles and incorporated into a separate structure, according to one example.

Referring now to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring now to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source (e.g., a vehicle dome light) when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2A:
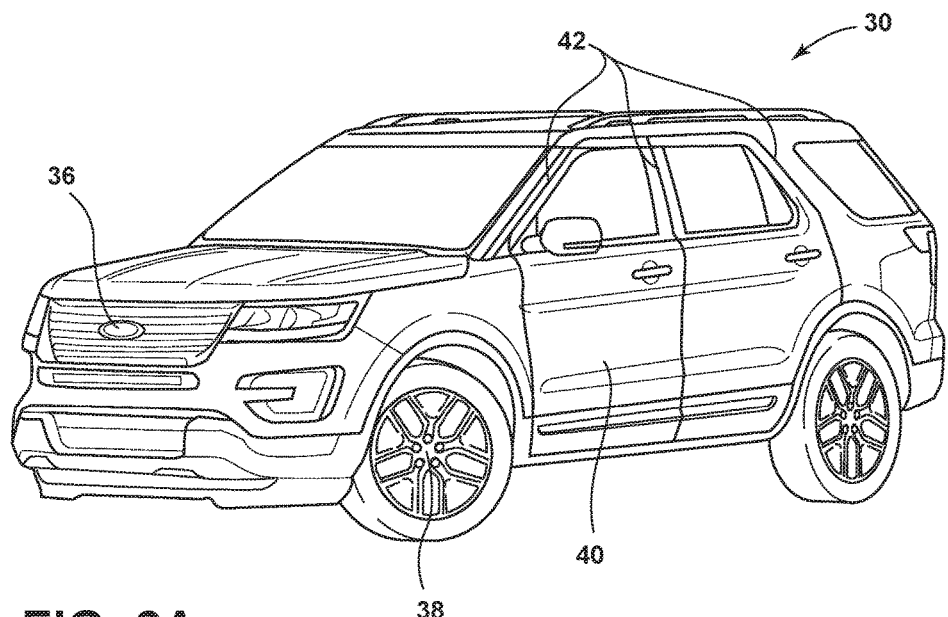
FIG. 2A is a perspective view of an exterior of a vehicle, according to one example.
Figure 2B:
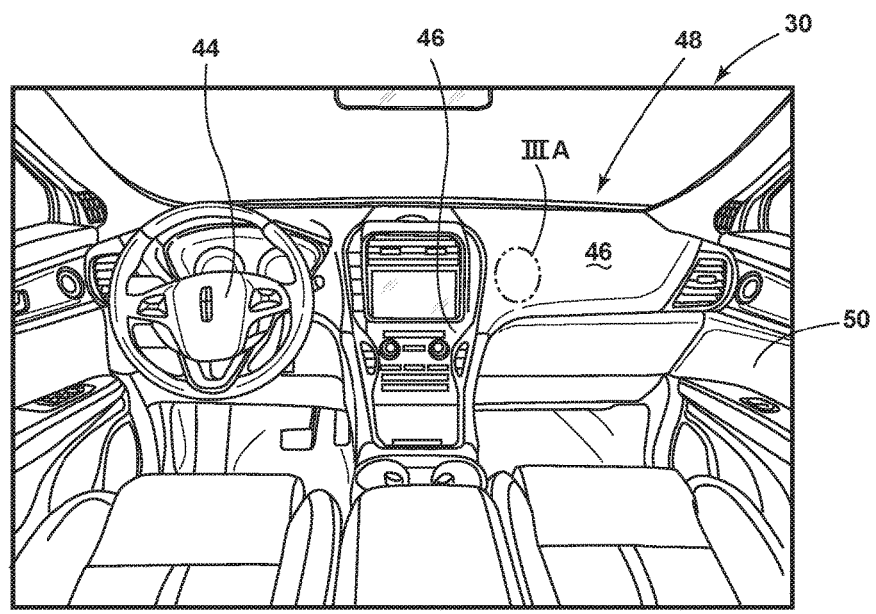
FIG. 2B is perspective view of an interior of the vehicle of FIG. 2A, according to one example.

Referring now to FIGS. 2A and 2B, depicted is a vehicle 30. Although depicted as a sport utility vehicle, the vehicle 30 may alternatively be a sedan, a coupe, a pick-up truck, van or other configuration without departing from the teachings provided herein. The vehicle 30 includes a variety of trim pieces 34 positioned on both an exterior (FIG. 2A) and interior (FIG. 2B) of the vehicle 30. For example, the trim piece 34 may be an exterior trim piece 34 such as a grille emblem 36, a wheel emblem 38, a door panel 40, an exterior pillar piece 42 (e.g., A-, B- and/or C-pillars), or other trim pieces positioned on an exterior of the vehicle 30. Further, the trim piece 34 may additionally or alternatively be positioned within an interior of the vehicle 30. For example, the trim piece 34 may be a steering wheel cover 44, an infotainment system cover, a dash cover 46 of an instrument panel 48, or an interior door cover 50. It will be understood that the foregoing description is exemplary and that other trim pieces 34 (e.g., a center console cover, glove box door, cup holder, interior pillar covers, instrument cluster hood) may be equally applicable to the teachings provided herein.

Figure 3A:
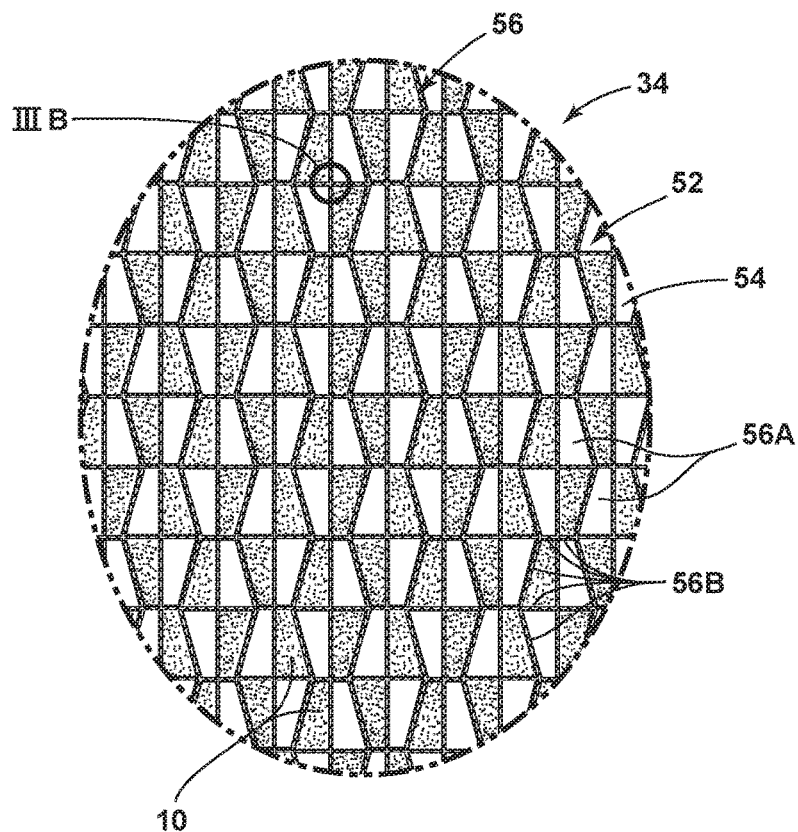
FIG. 3A is an enhanced view of an interior trim component taken at section IIIA of FIG. 2B, according to one example.
Figure 3B:
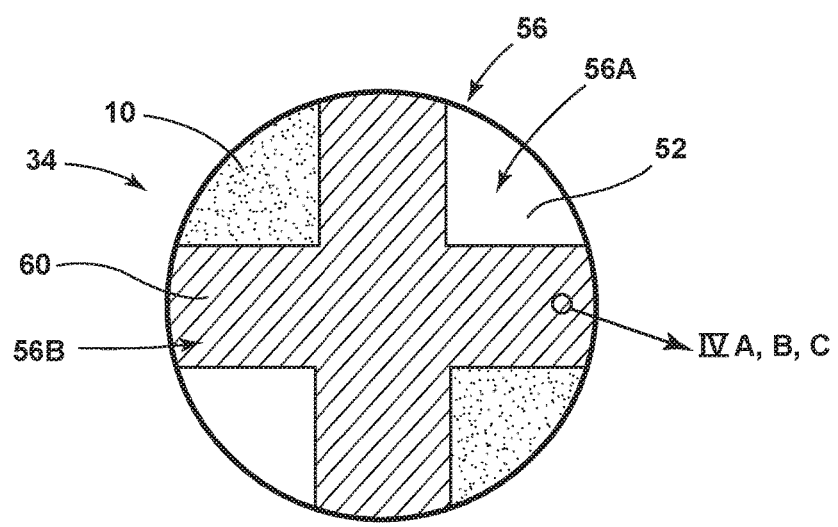
FIG. 3B is an enhanced view of the interior trim component taken at section IIIB of FIG. 3A, according to one example.

Referring now to FIGS. 3A and 3B, each of the trim pieces 34 may be formed of a substrate 52 defining one or more surfaces 54 (e.g., A- and B-surfaces of the substrate 52). The substrate 52 may be formed of a polymeric, metallic, or ceramic material. In polymeric examples, the substrate 52 may include acyclic, acrylonitrile butadiene styrene, nylon, polylactic acid, polycarbonate, polyether sulfone, polyethylene, polypropylene, polyvinyl chloride, a liquid crystal polymer, cyclo-olefin copolymer, other thermoplastic materials, thermoset materials and combinations thereof.

According to various examples, the substrate 52 of the trim piece 34 may be embossed, textured, engraved, or otherwise modified to define a pattern 56. It will be understood that the pattern 56 may be raised or lowered relative to the surface 54. In other examples, the pattern 56 may be in the same plane as the surface 54. In raised and/or lowered examples of the pattern 56, such raising and lowering may provide textural and/or visual depth to the trim piece 34 and/or pattern 56. The pattern 56 may be a symbol, alpha numeric text, a picture, a number, a logo, a simulated texture (e.g., a leather, wood grain, smooth, abrasive, and/or other texture) or a combination thereof. The substrate 52 may define one or more discrete patterns 56 (e.g., multiple separate patterns 56 spaced across the surface 54). According to various examples, the pattern 56 may be a large single indicia. According to other examples, the surface 54 may define a plurality of patterns 56 which tessellate across the surface 54 as shown in FIG. 3A. According yet to other examples, the surface 54 may define a plurality of patterns 56 which repeat across the surface 54 (i.e., in contact with, connected to and/or in a discontinuous manner).

The pattern 56 may define a body portion 56A and a border portion 56B. The body portion 56A of the pattern 56, in its simplest form, may be the unaltered surface 54 of the substrate 52 according to some examples. In other examples, the body portion 56A of the pattern 56 may include a texturing to alter a "feel" of the substrate 52 of the trim piece 34 or to reduce a glare or shine reflected from the substrate 52. Additionally or alternatively, one or more photoluminescent structures 10 may be positioned within the body portions 56A of the pattern 56. Inclusion of the photoluminescent structure 10 into the pattern 56 may provide an enhanced aesthetic appearance to the pattern 56 by highlighting, through illumination, different portions of the pattern 56. Further, small, discrete use of the photoluminescent structures 10 may provide a low, soft lighting which emanates from the trim piece 34. The photoluminescent structure 10 may be positioned solely in the body portion 56A, solely in the border portion 56B, or in combinations thereof. In other words, the photoluminescent structure 10 may be positioned proximate the pattern 56. It will be understood that different photoluminescent structures 10 may be positioned within different portions of the pattern 56 (e.g., different portions of the body portion 56A, and/or in the body portion 56A and border portion 56B). Further, the photoluminescent structure 10 may be incorporated within the substrate 52.

The border portion 56B is defined around the body portion 56A of the pattern 56. The border portion 56B may help to define and/or outline the pattern 56. It will be understood that the border portion 56B may extend inward from a perimeter into the pattern 56 to define visual detail to the pattern 56 or to define various portions of the pattern 56. In the depicted example of the tessellating Lincoln® logo pattern 56, the border portion 56B extends into the pattern 56 to separate the different facets (i.e., the body portions 56A) and provide enhanced visual detail to the logo. The border portion 56B may be differentiated from the body portion 56A by different textures, colors and/or depths in the substrate 52.

According to various examples, one or more diffraction grating 60 may be defined within the border portion 56B of the pattern 56. The diffraction grating 60 may be integrally defined by the surface 54 of the substrate 52, or may be part of an overcoat applied to the substrate 52. The diffraction grating 60 may be distinguished from traditional texturing or ridging of trim pieces 34 in that traditional texturing or ridging is configured to decrease shine, glare, reflectance and/or optical effects from the trim piece 34, while the diffraction grating 60 are configured to diffract and scatter light impinging on the trim piece 34. The border portion 56B may include a single, continuous, diffraction grating 60 extending throughout the border portion 56B. In continuous examples of the diffraction grating 60, the diffraction grating 60 may extend over a length of the border portion 56B to outline the pattern 56 or enhance visual detail. Alternatively, a plurality of diffraction grating 60 may be positioned around the pattern 56. In examples where a plurality of diffraction grating 60 are used around the border portion 56B, the different portions of the diffraction grating 60 may have different properties (e.g., spacing, period or blaze angle) which may cause each diffraction grating 60 to diffract light differently (i.e., be noticeably different from one another). Such an example may be advantageous in highlighting different portions of the pattern 56 from one another. In yet other examples, only a portion of the border portion 56B may include the diffraction grating 60 (i.e., to highlight a specific portion of the pattern 56). According to some examples, the diffraction grating 60 may not extend into the body portion 56A of the pattern 56. In other words, the body portion 56A may be substantially free of the diffraction grating 60. In other examples, the diffraction grating 60 may partially, substantially or fully fill the body portion 56A of the pattern 56. In yet other examples, the diffraction grating 60 may be solely positioned within the body portion 56A of the pattern 56. Examples where the diffraction grating 60 surrounds the pattern 56 in the border portion 56B may be advantageous in providing an aesthetically pleasing and noticeable look to the pattern 56. The pattern 56 may additionally or alternatively include the photoluminescent structure 10 within the border portion 56B (i.e., within the diffraction grating 60 or in portions of the border portion 56B not including the diffraction grating 60).

Figure 4A:
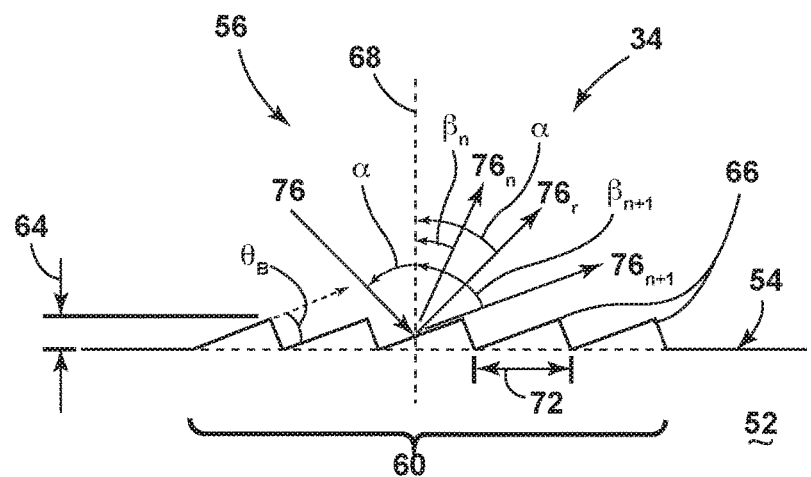
FIG. 4A is a cross-sectional view taken at line IIIA of FIG. 3B, according to one example.
Figure 4B:
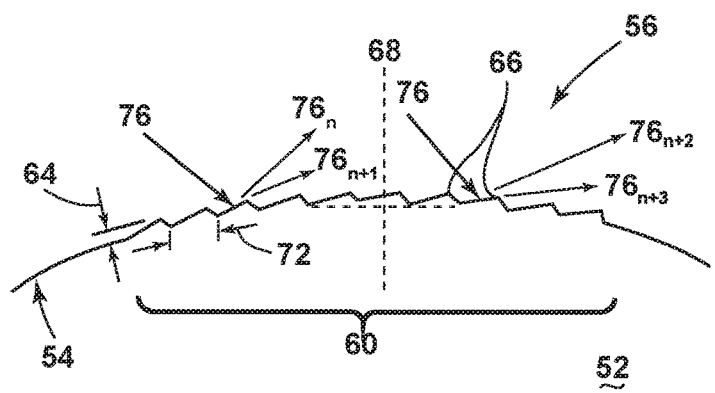
FIG. 4B is a cross-sectional view taken at section IIIB of FIG. 3B, according to one example.

Referring now to FIGS. 4A and 4B, the diffraction grating 60 is configured to produce an iridescent pattern to light impinging upon it. The diffraction grating 60 may be present on a flat example of the surface 54 (FIG. 4A) on a curved example of the surface 54 (FIG. 4B), or on other shapes of the surface 54. For example, the diffraction grating 60 may be configured to reflect light of different wavelengths in different directions. The diffraction grating 60 may have a thickness 64 that ranges from about 250 nm to about 1000 nm. The thickness 64 of the diffraction grating 60, for example, should be maintained in the range of about 250 nm to about 1000 nm to ensure that the diffraction grating 60 portion of the pattern 56 exhibits a jewel-like appearance in light. The thickness 64 of the diffraction grating 60 ranges from about 390 nm to 700 nm. In other embodiments, the thickness 64 of the diffraction grating 60 ranges from 500 nm to 750 nm. As depicted in FIG. 4A in exemplary form, the diffraction grating 60 may define a plurality of ridges 66 having a sawtooth or triangular shape. In three dimensions, the ridges 66 of the grating 60 can appear with a stepped or sawtooth shape without angular features, pyramidal in shape, or some combination of stepped and pyramidal shapes. Other shapes of the ridges 66 of the diffraction grating 60 include hill-shaped features (e.g., sinusoidal- or curved-shaped features). The diffraction grating 60 can also include portions with a combination of triangular- and hill-shaped ridges 66. More generally, the shapes of the grating 60 should be such that an effective blazing angle $\theta_B$ of at least 15 degrees is present for one or more portions of each ridge 66, grating, tooth or groove of the diffraction grating 60. The blaze angle $\theta_B$ is the angle between step normal (i.e., the direction normal to each step or tooth of the grating 60) and a direction normal 68 to the first surface 26A having the grating 60.

Generally, the blaze angle $\theta_B$ is optimized to maximize the efficiency of the wavelength(s) of the incident light which may be typical ambient sunlight, light from the photoluminescent structure 10 (FIG. 3A) or light from a light source, to ensure that maximum optical power is concentrated in one or more diffraction orders while minimizing residual power in other orders (e.g., the zeroth order indicative of the ambient light itself). An advantage of situating the diffraction grating 60 on planar portions or aspects of the surface 54 is that a constant blaze angle $\theta_B$ and a period 72 will result in consistent reflected and diffracted light produced from the diffraction grating.

The diffraction grating 60 of the trim piece 34 may be characterized by one or more periods 72 (also known as din the standard nomenclature of diffraction grating). In most aspects of the trim piece 34, the period 72 of the diffraction grating 60 is maintained between about 50 nm and about 5 microns. In general, the maximum wavelength that a given diffraction grating 60 can diffract is equal to about twice the period 72. Hence, a diffraction grating 60 with a period 72 that is maintained between about 50 nm and about 5 microns can diffract light in an optical range of 100 nm to about 10 microns. According to one example, the period 72 of a diffraction grating 60 is maintained from about 150 nm to about 400 nm, ensuring that the diffraction grating 60 can efficiently diffract light in an optical range of about 300 nm to about 800 nm, roughly covering the visible spectrum.

Incident light 76 (typically ambient, sun light and light from the photoluminescent structure 10) at an incident angle α is directed against a sawtooth-shaped diffraction grating 60 having a thickness 64, a period 72 and a blaze angle $\theta_B$. More particularly, a portion of the incident light 76 (preferably, a small portion) striking the diffraction grating 60 at an incident angle α is reflected as reflected light 76r at the same angle α, and the remaining portion of the incident light 76 is diffracted at particular wavelengths corresponding to diffracted light 76n, 76n+1, etc., at corresponding diffraction angles βn, βn+1, etc. The reflected light 76r is indicative of the zeroth order (i.e., n=0) and the diffracted light $76_n$, $76_{n+1}$, $76_{n+2}$ are indicative of the nth order diffraction according to standard diffraction grating terminology, where n is an integer corresponding to particular wavelengths of the reflected or diffracted light.

Figure 4C:
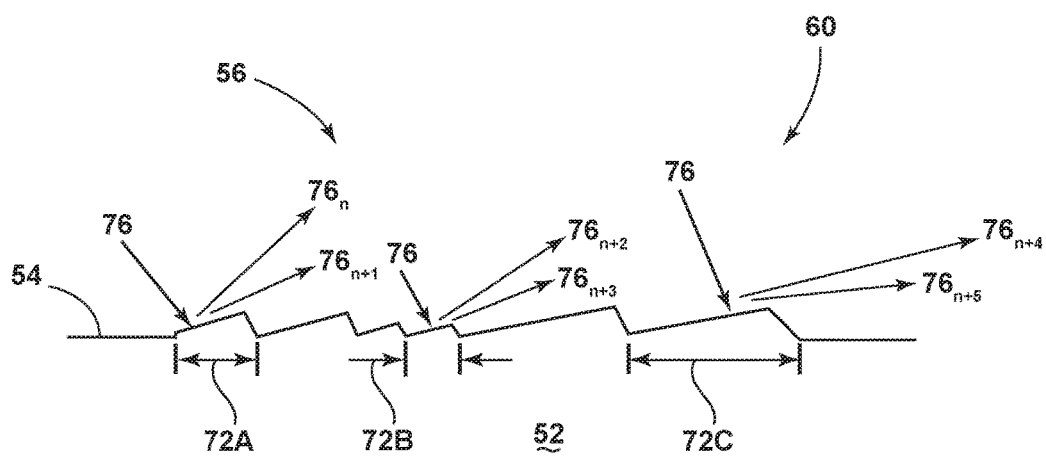
FIG. 4C is a cross-sectional view taken at section IIIC of FIG. 3B, according to one example.

Referring now to FIG. 4C, an example of the diffraction grating 60 employing varying periods (e.g., as including a set of periods) that can be employed in iridescent appliques 14 is depicted in a cross-sectional form, according to an aspect of the disclosure. In the depicted example, the diffraction grating 60 can have two or more sets of teeth or grooves, each having a particular period 72 that can produce light at unique or differing diffraction orders. As shown, the grating 60 is configured with three periods—period 72A, period 72B, and period 72C. One set of teeth of the diffraction grating 60 with a period of 72A can produce diffracted light $76n$ and $76_{n+1}$, a different set of teeth with a period of 72B can produce diffracted light $76_{n+2}$ and $76_{n+3}$, and a third set of teeth with a period of 72C can produce diffracted light $76_{n+4}$ and $76_{n+5}$, all from the same incident light 76. Consequently, the diffraction grating 60 advantageously can produce jewel-like effects of widely varying wavelengths within various regions of the pattern 56.

In some aspects, the diffraction grating 60 includes a varying period that varies between two to ten discrete values or, more preferably, between two to five discrete values across the diffraction grating 60. According to another aspect, the diffraction grating 60 with varying periods can be employed in one or more portions of the pattern 56 and/or surface 54 of the trim piece 34, and one or more diffraction grating 60 having a constant period are employed in other portions of the pattern 56 and/or trim piece 34 to create interesting, jewel-like appearance effects produced by the trim piece 34 employing the grating. In another example, the diffraction grating 60 includes a varying period that changes between any number of values, only limited by the overall length of the grating 60 and/or the processing capabilities to develop such variability through precise control of mold dimensions. In another embodiment there may be a plurality of diffraction grating 60 in a spaced-apart configuration across the surface 54 of the trim piece 34. In such an embodiment, the plurality of diffraction grating 60 may have the same or a different period. In yet another embodiment, the diffraction grating(s) 60 may substantially cover the surface 54.

In some examples, optional coatings may be applied over the surface 54 of the trim piece 34. For example, an optically clear sealing layer (e.g., a polyurethane seal) can be applied over exterior surfaces to add further mechanical and/or ultraviolet light protection to the trim piece 34, particularly to any diffraction grating 60. Advantageously, the addition of a relatively thin protective coating can protect the diffraction grating 60 while retaining the benefits of locating the grating 60 on the surface 54 of the trim piece 34 in terms of diffraction efficiency and the overall iridescence obtained by the trim piece 34. Further, the sealing layer may be textured (i.e., on interior applications) to provide a desired "feel" (e.g., leather, wood, soft, etc.) to the pattern 56 and/or trim piece 34.

According to another aspect of the disclosure, a method of making an iridescent member (e.g., the trim piece 34) is provided that includes a step of forming a mold with mold surfaces corresponding to the components of the iridescent member (e.g., substrate 52, pattern 56, etc.).

Next, the method of forming the iridescent member includes a step of ablating at least one of the mold surfaces to form one or more diffraction grating mold surfaces. For example, the ablating step is conducted to form one or more diffraction patterns (e.g., diffraction grating 60) on the mold surfaces intended to be incorporated in portions of the iridescent member (e.g., trim piece 34). According to various examples, the ablating step is conducted with a laser ablation process. Laser ablation processes (e.g., employing an AgieCharmilles Laser cutting apparatus from Georg Fischer Ltd.) are particularly adept at developing the diffraction pattern mold surfaces in the mold given their ability to precisely ablate microscopic features into metal and metal alloy mold surfaces. The diffraction grating 60 may be formed in one or more patterns on the mold surface. It will be understood that the pattern 56 may be formed at the same or substantially the same time as the diffraction grating 60.

Referring again to the method of making the iridescent member, the method may also include a step of forming a component (e.g., the substrate 52) of the iridescent member (e.g., applique 14). The component may be formed according to known injection molding techniques employed by those skilled in the field with the mold described above. As such, the component may include the diffraction grating 60 and the pattern 56 integrally defined therein.

Use of the present disclosure may offer several advantages. First, use of the diffraction grating 60 may allow for the creating of iridescent and/or jewel-like patterns in trim pieces 34. Second, the disclosed trim pieces 34 may define a wide variety of different patterns 56. Third, the disclosed patterns 56 may be applied to both interior and exterior trim pieces 34.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below are incorporated into and constitute part of this Detailed Description.

What is claimed is:

1. A trim piece positioned on an instrument panel, comprising:
    a surface defining a pattern, the pattern defining a body portion and a border portion, wherein the border portion includes a plurality of sections separating the body portion into first and second portions; and
    a diffraction grating integrally defined by the border portion, wherein the diffraction grating has a thickness of between about 250 nm to about 1000 nm.

2. The trim piece positioned on an instrument panel of claim 1, wherein the thickness of the diffraction grating is between about 500 nm and about 750 nm.

3. The trim piece positioned on an instrument panel of claim 2, wherein a period of the diffraction grating is between about 50 nm and about 5 microns.

4. The trim piece positioned on an instrument panel of claim 1, wherein the diffraction grating extends over a length of the border portion to outline the pattern.

5. The trim piece positioned on an instrument panel of claim 4, wherein the body portion is substantially free of the diffraction grating.

6. The trim piece positioned on an instrument panel of claim 1, further comprising:
    a photoluminescent structure positioned proximate the pattern.

7. The trim piece positioned on an instrument panel of claim 1, wherein the pattern defines at least one of a logo and a simulated material.

8. The trim piece positioned on an instrument panel of claim 7, wherein the pattern repeats across the trim piece.

9. An exterior trim component, comprising:
    a surface defining a pattern, wherein the pattern comprises
        a body portion having first and second sections and a border portion separating the first and second portions of the body portion; and
    a diffraction grating externally positioned within the border portion, wherein the diffraction grating comprises a plurality of ridges having a thickness of between about 250 nm to about 1000 nm and a period of the diffraction grating is between about 50 nm and about 5 microns.

10. The exterior trim component of claim 9, wherein the diffraction grating extends over a length of the border portion to outline the pattern.

11. The exterior trim component of claim 9, wherein the body portion is substantially free of the diffraction grating.

12. The exterior trim component of claim 9, further comprising:

a photoluminescent structure positioned proximate the pattern.

13. The exterior trim component of claim 9, wherein the pattern defines a logo.

14. The exterior trim component of claim 9, wherein the pattern defines a simulated material.

15. A vehicle trim component, comprising:
a surface defining a pattern, wherein the pattern comprises a body portion and a border portion, the border portion comprising first and second border sections that intersect at an offsetting angle to at least partially define the body portion; and
a diffraction grating positioned within the border portion, wherein the diffraction grating extends over a length of the border portion to outline the pattern.

16. The trim component of claim 15, wherein the body portion is substantially free of the diffraction grating.

17. The trim component of claim 16, wherein the diffraction grating is configured to diffract incident light.

18. The trim component of claim 17, wherein the pattern defines a logo.

19. The trim component of claim 18, wherein the diffraction grating comprises a plurality of ridges having a thickness of between about 250 nm to about 1000 nm and a period of the diffraction grating is between about 50 nm and about 5 microns.

20. The trim component of claim 17, wherein the pattern defines a simulated material.

* * * * *